(12) United States Patent
Kooy et al.

(10) Patent No.: US 8,499,276 B2
(45) Date of Patent: Jul. 30, 2013

(54) MULTI-PLATFORM GRAPHICAL USER INTERFACE

(75) Inventors: Darrell J. Kooy, Aurora, IL (US); Bruce A. DeFrang, Batavia, IL (US); Patrick R. Lee, Bolingbrook, IL (US)

(73) Assignee: CA, Inc., Islandia, NY (US)

( * ) Notice: Subject to any disclaimer, the term of this patent is extended or adjusted under 35 U.S.C. 154(b) by 1074 days.

(21) Appl. No.: 11/617,518

(22) Filed: Dec. 28, 2006

(65) Prior Publication Data

US 2008/0163080 A1 Jul. 3, 2008

(51) Int. Cl.
*G06F 9/44* (2006.01)

(52) U.S. Cl.
USPC .......................................................... 717/100

(58) Field of Classification Search
USPC .......................................................... 717/100
See application file for complete search history.

(56) References Cited

U.S. PATENT DOCUMENTS

| | | | | |
|---|---|---|---|---|
| 5,457,797 | A * | 10/1995 | Butterworth et al. | 719/320 |
| 5,973,696 | A * | 10/1999 | Agranat et al. | 715/760 |
| 6,405,366 | B1 | 6/2002 | Lorenz, Sr. et al. | 717/107 |
| 6,430,556 | B1 | 8/2002 | Goldberg et al. | 707/4 |
| 6,434,739 | B1 * | 8/2002 | Branson et al. | 717/108 |
| 6,628,305 | B1 | 9/2003 | Hong et al. | 345/734 |
| 6,681,043 | B1 | 1/2004 | Lau et al. | 382/173 |
| 6,690,400 | B1 * | 2/2004 | Moayyad et al. | 715/779 |
| 6,930,695 | B1 * | 8/2005 | Pabla | 715/805 |
| 6,996,832 | B2 | 2/2006 | Gunduc et al. | 719/331 |
| 7,392,483 | B2 * | 6/2008 | Wong et al. | 715/746 |
| 7,451,403 | B1 * | 11/2008 | Srinivasan et al. | 715/763 |
| 8,224,650 | B2 * | 7/2012 | Galanes et al. | 704/270.1 |
| 8,332,830 | B2 * | 12/2012 | Kantorowitz et al. | 717/148 |
| 2002/0083163 | A1 * | 6/2002 | Collazo | 709/223 |
| 2002/0191018 | A1 * | 12/2002 | Broussard | 345/746 |
| 2004/0107415 | A1 * | 6/2004 | Melamed et al. | 717/124 |
| 2004/0205695 | A1 | 10/2004 | Fletcher | 717/105 |
| 2005/0033763 | A1 | 2/2005 | Chen et al. | 707/102 |
| 2005/0044526 | A1 | 2/2005 | Kooy | 717/106 |
| 2007/0067341 | A1 * | 3/2007 | Chen et al. | 707/104.1 |

FOREIGN PATENT DOCUMENTS

| | | |
|---|---|---|
| EP | 1 037 143 A1 | 9/2000 |
| EP | 1 280 068 A2 | 1/2003 |
| WO | WO 02/48866 A2 | 6/2002 |
| WO | WO 02/48866 A3 | 6/2002 |
| WO | WO 02/097610 | 12/2002 |

OTHER PUBLICATIONS

Calvary et al., "A unifying reference framework for multi-target user interfaces", 2003, Elsevier Science.*

(Continued)

*Primary Examiner* — Wei Zhen
*Assistant Examiner* — Junchun Wu
(74) *Attorney, Agent, or Firm* — Pillsbury Winthrop Shaw Pittman LLP (57) ABSTRACT

The invention provides systems and methods for developing multi-platform graphical user interface (GUI) for a target software application. In invention includes assessing one or more functional requirements of the target software application and defining a functional specification for the multi-platform GUI using the assessed functional requirements. The functional specification is used to develop source code for the graphical user interface. An abstraction framework that evaluates functions of the GUI source code and provides instruction to perform the functions in each of the plurality of operating environments is then developed and used as an intermediary between the GUI source code and each of the plurality of operating environments.

10 Claims, 4 Drawing Sheets

OTHER PUBLICATIONS

Hill et al., "An Application Framework and Intelligent Graphic User Interface for Multiple Accelerator Codes", 1998, G.H. Gillespie Associates.*

Bishop, "Multi-platform User Interface Construction—A Challenge for Software Engineering-in-the-Small", May 2006, ACM.*

"Eclipse Platform Technical Overview", Object Technology International, Inc. XP-002301941, Feb. 2003, pp. 1-20.

Mayer, J., et al., "Lightweight Plug-In-Based Application Development", *Objects, Components, Architectures, Services, and Applications for a Networked World* (Lecture Notes in Computer Science, vol. 2591), Jan. 1, 2003, pp. 87-102, XP0025355596, ISBN 3-540-00737-7.

Mayer, J, "Graphical User Interfaces Composed of Plug-Ins", *Proceedings of the 4th European GCSE Young Researchers Workshop 2002*, Fraunhofer IESE, Technical Report No. 053.02/E, Oct. 21, 2002, pp. 25-29 (pp. 33-37), XP007909096.

* cited by examiner

MULTI-PLATFORM GRAPHICAL USER INTERFACE

FIELD OF THE INVENTION

The invention relates to a system and method for developing a graphical user interface for a software application that is operable in multiple operating environments.

BACKGROUND OF THE INVENTION

Software application development typically begins with one or more software engineers or other persons conceiving the functionality of the application. Development proceeds as the engineers or other persons develop code for a prototype of the software application. In some development environments, software developers and engineers may then present this prototype to managers and/or other product-oriented decision makers. Presentation of the prototype may involve demonstrating the software application's operation in a plurality of different operating environments (e.g., different operating systems, networked vs. local environments, or other environments). To enable presentation that illustrates the functionality of the software application in these different operating environments, software developers typically must develop several separate graphical user interfaces (GUIs) for the software application. Alternatively, the developers may write a GUI for a single operating environment and "port" it (e.g., adapt the code) to other operating environments.

Both of these options present an obstacle for software developers: additional time and effort is spent developing several GUIs for several different operating environments. This additional time and effort is spent solely for the purpose of presentation to managers, who then may choose only one or two of those environments in which the final product will run. If some of the environments are not pursued, then the GUIs developed for these environment are essentially wasted effort. These wasted efforts represent resources that could be conserved or used elsewhere. Instead, these resources are expended developing, for example, mouse functionality, keyboard functionality, data input/output interaction, and/or other GUI functionality for environments that may never be pursued. Even more resources may be expended in developing more functional prototype GUIs that interact and function with back end systems and/or other interfaces.

If developers decide to limit the number of prototype GUIs that are initially created (e.g., create GUIs for only a limited number of operating environments), there is a risk that the software application will later be used in one or more of the remaining platforms for which a GUI was not developed. In this situation, further effort is necessary to develop interfaces for these platforms.

As such, there exists a need for tools for developing graphical user interfaces that can be run on a plurality of different platforms or operating environments.

SUMMARY OF THE INVENTION

The invention solving these and other problems in the art relates to a system and method for developing a graphical user interface (GUI) for a software application that is operable on multiple platforms.

In some embodiments, the invention utilizes an object oriented programming language for the source code of the multi-platform GUI. Examples of object oriented programming languages that can be used for the source code of the multi-platform GUI include Java, C++, or Visual Basic. Other languages and runtime environments may also be used. Object-oriented programming languages such as, for example, Java may be used because they have a flexible architecture and easily interface with a variety of operating systems and platforms. Furthermore, Java and other languages support small, independent program entities that work within a larger software program (e.g., "plug-ins") that are easily used to assemble any number of different GUIs having different functional aspects.

In some embodiments, the invention includes a method for developing a multi-platform GUI that can operate in multiple operating environments. As used herein, an operating environment may include, for example, any one of various thick client platforms, any one of various thin client platforms, or platforms having other characteristics. As used herein, a "thick client" platform includes a device, operating system, and/or other software that is functional using local resources (e.g., is operable without connection to one or more server-based resources). An example of thick client operating environments may include Microsoft Windows™, UNIX, Linux™, or other locally run operating system. As used herein, a "thin client" platform includes a device and/or software that is functional while deriving most of its resources from one or more remote machines or servers. An example of a thin client platform may include a specific web-based application, such as Netscape Navigator™, Microsoft Internet Explorer™, Mozilla™, Firefox™, or other browser that operates within a client's active high level memory (i.e., RAM), but does not directly embed processing functionality on the client. Instead, a backbone server may be remotely accessed by an internet web or other network connection.

In some embodiments, a method for developing a multi-platform GUI includes first assessing/identifying the functional requirements of the target software application (i.e., the application for which the GUI is being developed) that are directly related to the user interface. In some embodiments, this may include assessing the necessary keyboard functionality, mouse functionality, considerations regarding data to be input by a user, considerations regarding data output to a user, visual display of data, or assessing other requirements.

In some embodiments, the identified functional requirements may be used to produce a functional specification for the resultant multi-platform GUI. The functional specification is essentially a detailed outline of the multi-platform GUI, customized specifically for the target software application.

Once the requirements of the target software application are assessed, and the functional specification produced, a programming language in which to write the GUI may be chosen. As indicated herein, in some embodiments, Java or other object-oriented programming language may be chosen, as object-oriented languages provide a great amount of interoperability with multiple operating systems and operating environments, including both thick client and thin client environments.

Once the programming language is chosen, source code for the GUI may be written in the chosen language. In some embodiments, the source code may be written according to the functional specification described above. Because an abstraction framework is utilized to translate between the GUI and the ultimate operating environment, the source code for the GUI may be written without regard to the operating environment on which the software application will run. All of the requirements and functions of the software application that interface with the operating environment do so through the abstraction framework (described below). As such, the development of the GUI is simplified and there is no need to develop different GUIs for different operating environments.

In some embodiments, the plurality of platforms on which the multi-platform GUI will be able to operate (i.e., the "target platforms") are chosen. In some embodiments, these platforms may be chosen based on the probability that the platforms will be used in conjunction with the target software application. Other factors may also be used.

Once the target platforms are chosen, an abstraction framework for the multiplatform GUI may be written (hand written source code—e.g., java code), assembled (e.g., one or more classes pieced together to form the functional abstraction framework), or otherwise developed. The abstraction framework operates between the display and interface functionality of the GUI as rendered by the operating environment and the source code of the GUI. In some embodiments, the abstraction framework may include one or more classes (e.g., Java classes or other object-oriented class objects) that interface with the operating environment/platform (including thick client and thin client operating environments) regardless of which of the plurality of target platforms is being used. Additionally, the one or more classes interact with the GUI source code in a standardized fashion, regardless of what type of operating environment is used and how the classes must interact with that operating environment. The one or more classes do this by assessing the functionality of the source code of the GUI (e.g., what is the GUI trying to do?) and translating the functionality to fit each of the target platforms (e.g., what instructions are necessary to do it in each of these operating environments?).

As such, the abstraction framework is designed specifically to operate between the language chosen for the GUI source code and each of the plurality of target platforms. Once the abstraction framework is developed, a plurality of different multi-platform GUI's may be written in the chosen language and implemented on any of the target platforms. Additionally, if desired, the abstraction framework may be designed to operate between source code written in multiple languages and the chosen platforms. Thus, the abstraction framework provides an adaptation tool that may be utilized over and over to implement multi-platform GUIs for different target software applications.

The abstraction framework removes the need for the GUI source code (or the developer of the GUI source code) to consider any aspect of the operating environment. For example, if the target platform is a specific thin client environment, the one or more classes recognize this and deal with the different back-end and front-end resources involved in GUI operability. If target operating is a thick client environment, the one or more classes also recognize this and deal with all of the local resources involved with GUI operability. The GUI source code developer is not concerned with the target platform (he or she need not even know what the target platforms are), but can concentrate on the functionality of the GUI. For example, a "text field" is always considered the same by the GUI source code developer. It is a field into which a user enters text. Additionally, a "push button" is always considered an item that a user clicks on to initiate an action. The GUI developer does not need to know how to make a "text field" or a "push button" work in the various target platforms, only how to write them in the selected programming language of the GUI source code.

Because the GUI source code deals with the abstraction framework in a standard fashion, the abstraction framework provides a ubiquitous interface with the different operating environments. Within categories of thin client and thick client environments, there may be differences with how different browsers/operating systems interact with GUIs. The abstraction framework also deals with these differences, regardless of how the GUI is written, providing still more interoperability.

There are many methods that can be used by the abstraction framework to determine what platform is trying to run the GUI (or what platform the GUI is trying to run on) such as, for example, detecting and analyzing parameters passed to the target application, registry settings of the target platform, property files, "ini" files, or other methods. The GUI layer itself, however, is the same regardless of the operating environment/platform.

In some embodiments, the invention provides a system for developing a multi-platform GUI for a software application. In some embodiments, the system may include a specification engine, an abstraction framework engine, an abstraction framework, a GUI development engine, and/or other elements.

In some embodiments, the specification engine may include one or more software modules, developers (e.g., people), and/or other elements that asses/identify the functional requirements of the target software application for which a GUI is to be developed. The specification engine may also produce a functional specification for the GUI that is specific to the target software application. In some embodiments, the functional specification may be represented as data stored in one or more formats (e.g., in a database or computer memory, an outline on a sheet of paper, in a computer readable format, or other format).

In some embodiments, the abstraction framework engine may include one or more software modules, developers, and/or other elements that produce a software piece (e.g., a module) that recognizes the functional demands of the source code of a GUI and translates those demands to a plurality of target platforms/operating environments. In some embodiments, the abstraction framework engine may write, assemble or otherwise develop one or more classes (e.g., Java classes) that are used to interface between the GUI source code and the multiple target operating environments. As these one or more classes comprising the abstraction framework (or other software elements comprising the abstraction framework) comprise source code, they can be created in many different ways such as, for example, written in Notepad or any number of Integrated Development Environments (IDEs) such as Microsoft's Visual Studio™ or Eclipse™. In some embodiments, the abstraction framework may include additional elements.

In some embodiments, the development engine may include one or more software modules, developers, and/or other elements that write, assemble, or otherwise produce source code for the multi-platform GUI. The multi-platform GUI source code my be produced according to the functional specification. The multi-platform GUI source code relies upon the abstraction framework to provide functional interactivity with the operating environment on which the GUI is run. The GUI need not be modified to run on different operating environments, as the abstraction framework provides a ubiquitous interface with the GUI and handle any differential interaction with the operating environment.

In some embodiments, the system for developing a multi-platform GUI for a software application may include one or more processors, memory devices, I/O devices, data storage devices, and/or other elements necessary to support, store, implement, or operate one or more of the specification engine, the abstraction framework engine, the abstraction framework, the development engine, GUI source code, or other elements of the system, in a computer implemented environment.

These and other objects, features, and advantages of the invention will be apparent through the detailed description and the drawings attached hereto. It is also to be understood that both the foregoing summary and the following detailed description are exemplary and not restrictive of the scope of the invention.

DETAILED DESCRIPTION

The invention relates to a system and method for developing a graphical user interface (GUI) for a software application that is operable on multiple operating environments/platforms. As used herein, the terms operating environment or platform may include, for example, any one of various thick client platforms or any one of various thin client platforms. A "thick client" platform may include a device, operating system, and/or software that is functional using local resources (e.g., is operable without connection to one or more server-based resources). An example of thick client operating environments may include Microsoft Windows™, UNIX, Linux™, or other locally run operating system. A "thin client" platform may include a device and/or software that is functional while deriving most of its resources from one or more remote machines or servers. An example of a thin client platform may include a specific web-based application, such as Netscape Navigator™, Microsoft Internet Explorer™, Mozilla™, Firefox™, or other browser that operates within a client's active high level memory (e.g., RAM), but does not directly embed processing functionality on the client. Instead, a backbone server may be remotely accessed by an internet web or other network connection.

Figure 1:
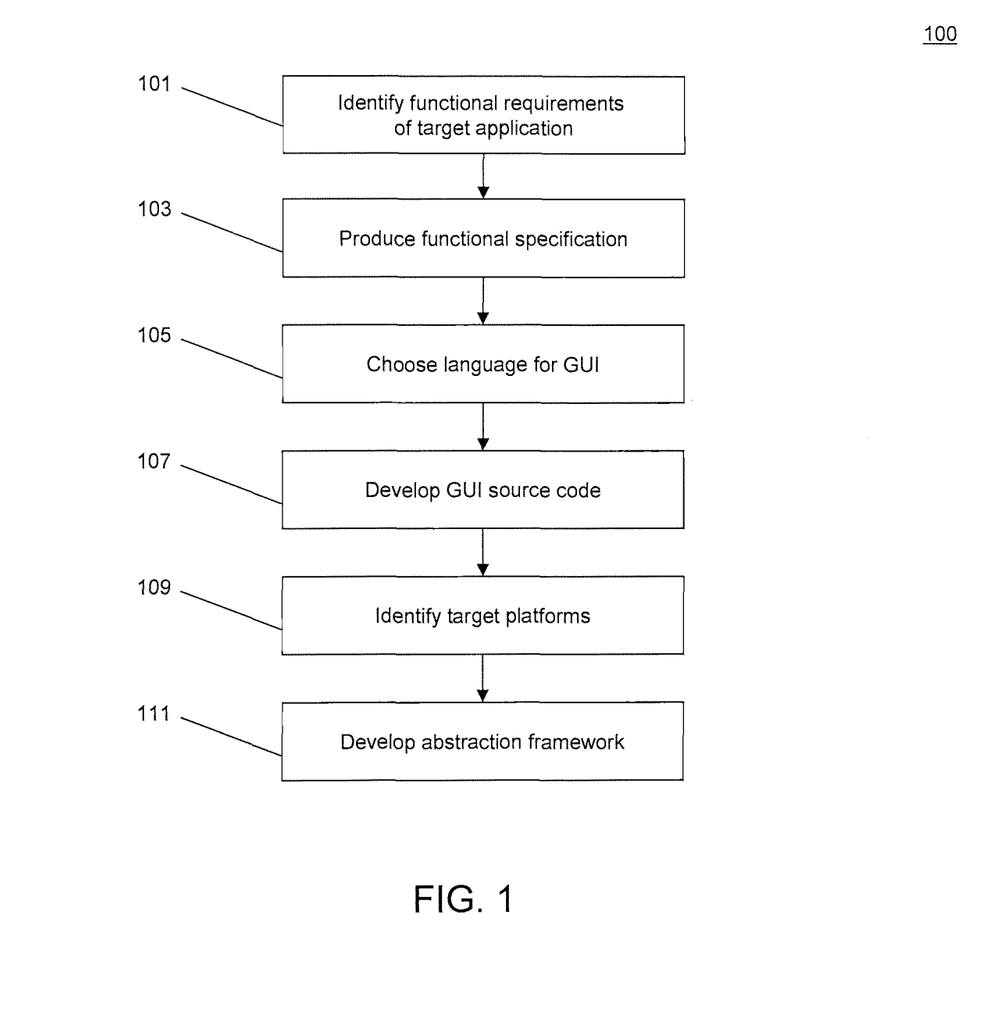
FIG. 1 illustrates an example of a process for developing an abstraction framework, according to an embodiment of the invention.

FIG. 1 illustrates a process 100, which is an example of a process for developing a multi-platform GUI. Process 100 includes an operation 101, wherein the functional requirements of a target software application (i.e., the application for which the GUI is being developed) that relate to the user interface of the target software application are assessed/identified. In some embodiments, this may include assessing the necessary keyboard functionality, mouse functionality, considerations regarding data to be input by a user, considerations regarding data output to a user, visual display of data, or assessing other requirements.

In an operation 103, the identified functional requirements may be used to produce a functional specification for the resultant multi-platform GUI. The functional specification is essentially a detailed outline of the multi-platform GUI, customized specifically for the target software application.

Once the requirements of the target software application are identified, and the functional specification produced, a programming language in which to write the GUI may be chosen in an operation 105. As indicated herein, in some embodiments, Java or other object-oriented programming language may be chosen, as object-oriented languages provide a great amount of interoperability with multiple operating systems and operating environments, including both thick client and thin client environments. While the abstraction framework of the invention ultimately provides all of the interoperability necessary to run the multi-platform GUI in any chosen platform, regardless of the language in which the GUI is written, use of a programming language with increased interoperability as the GUI source code language simplifies construction and use of the abstraction framework.

Once the programming language is chosen, source code for the GUI may be written in the chosen language in an operation 107. In some embodiments, the source code may be written according to the functional specification described above. Because the abstraction framework provides interoperability between the GUI and the operating environment, the source code for the GUI may be written without regard to the operating environment on which the software application will run. All of the requirements and functions of the software application that interface with the operating environment do so through the abstraction framework (described below). As such, the development of the GUI is simplified and there is no need to develop different GUIs for different operating environments.

In an operation 109, the plurality of platforms/operating environments on which the multi-platform GUI will be able to operate (i.e., the "target platforms") is chosen. In some embodiments, these platforms may be chosen based on the probability that the platforms will be used in conjunction with the target software application. Other factors may be used. Choosing the target platforms on which the multi-platform GUI will be run is not dependent on any of the previous operations, as the abstraction framework makes the specific platform on which the GUI will run irrelevant to the drafter of the GUI code.

Once the target platforms are chosen, an abstraction framework for the multiplatform GUI may be written (hand written source code—e.g., java code), assembled (e.g., different classes pieced together to form the functional abstraction framework), or otherwise developed in an operation 111. As the abstraction framework itself comprises source code, it can be created in many different ways such as, for example, written in Notepad or any number of Integrated Development Environments (IDEs) such as Microsoft's Visual Studio™ or Eclipse™.

The abstraction framework operates between the display and interface functionality of the GUI as rendered by the operating environment and the source code of the GUI. In some embodiments, the abstraction framework may include one or more classes (e.g., Java classes or other object-oriented class objects) that interface with the operating environment/platform (including thick client and thin client operating environments) regardless of which of the plurality of target platforms is being used. Additionally, the one or more classes interact with the source code in a standardized fashion, regardless of what type of operating environment us used and how the classes must interact with that operating environment. The one or more classes do this by assessing the functionality of the source code of the GUI (e.g., what is the GUI trying to do?) and translating the functionality to fit each of the target platforms (e.g., what instructions are necessary to do it in each of these operating environments?).

As such, the abstraction framework is designed specifically to operate between the language chosen for the source code and each of the plurality of chosen target platforms. Once the abstraction framework is developed, a plurality of different multi-platform GUI's may be written in the chosen language and implemented on any of the target platforms. Additionally, if desired, the abstraction framework may be designed to operate between GUI source code written in multiple languages and the chosen platforms. Thus, the abstraction framework provides an adaptation tool that may be utilized over and over to implement multi-platform GUIs for different target software applications.

The abstraction framework removes the need for the source code (or the developer of the source code) to consider any aspect of the operating environment. For example, if the target platform is a specific thin client environment, the one or more classes recognize this and deal with the different back-end and front-end resources involved in GUI operability. Additionally, in thin client platforms, the classes used by the abstraction framework to communicate to back-end systems utilized by the multi-platform GUI may be the same regardless of the operating environment/platform, if some common method of invoking the back-end systems is used (e.g., web-services). If target operating is a thick client environment, the one or more classes also recognize this and deal with all of the local resources involved with GUI operability.

As described above, the GUI source code developer is not concerned with the target platform (he or she need not even know what the target platforms are), but can concentrate on the functionality of the GUI. For example, a "text field" is always considered the same by the GUI source code developer. It is a field into which a user enters text. Additionally, a "push button" is always considered an item that a user clicks on to initiate an action. The GUI developer does not need to know how to make a "text field" or a "push button" work in the various target platforms. He or she simply needs to know how to draft, assemble, or otherwise indicate the functionality of a "text field" or a "push button" in the programming language of the source code of the GUI.

Figure 2:
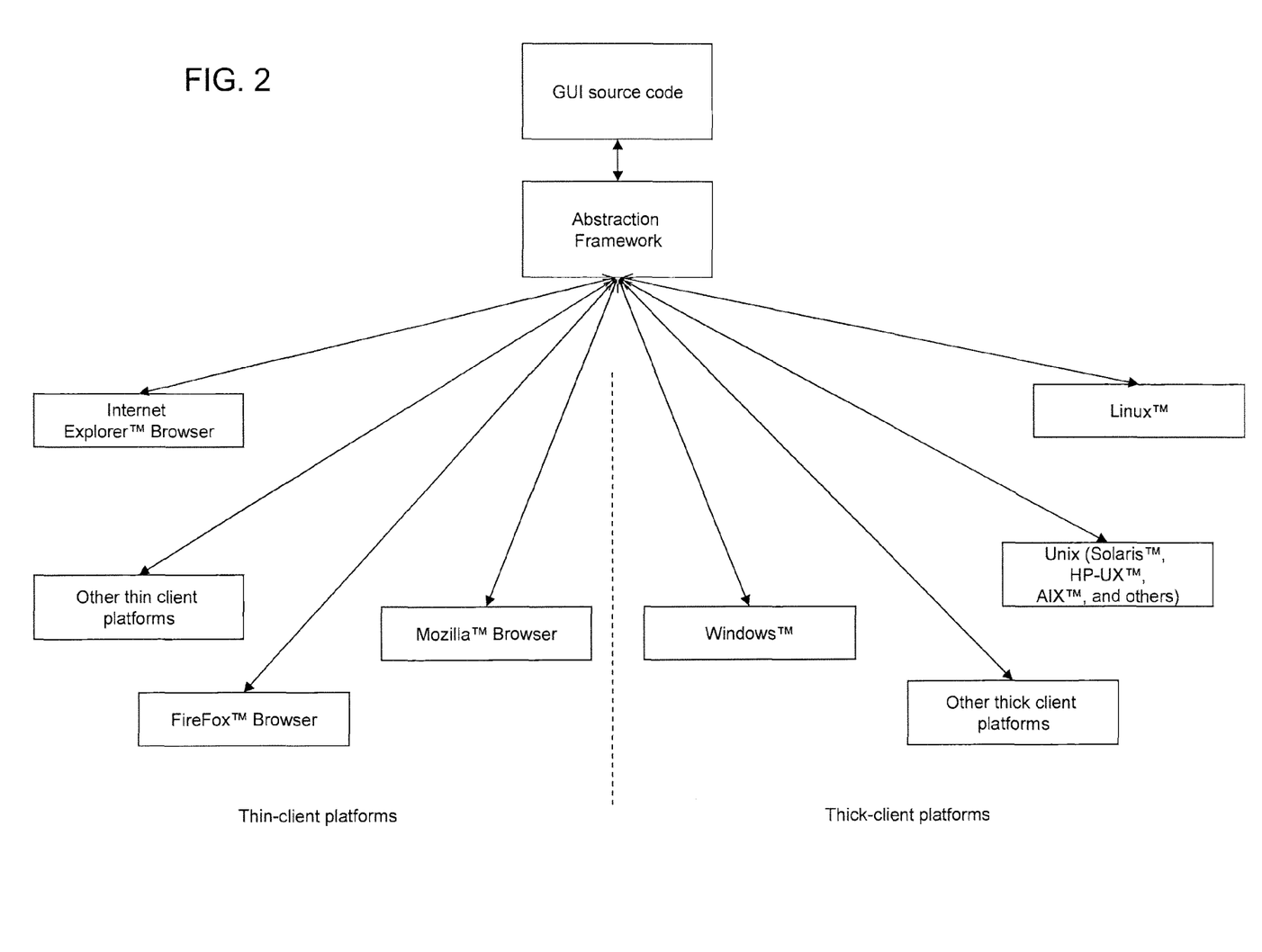
FIG. 2 illustrates an example of an abstraction framework acting as an intermediary between GUI source code and a plurality of operating environments, according to an embodiment of the invention.

Because the GUI source code deals with the abstraction framework (e.g., the one or more classes of the abstraction framework) in a standard fashion, the abstraction framework provides a ubiquitous interface with the different operating environments, as illustrated in FIG. 2. Furthermore, within categories of thin client and thick client environments, there may be differences with how different browsers/operating systems interact with GUIs. The abstraction framework also deals with these differences regardless of how the GUI is written, providing still more interoperability.

Figure 3:
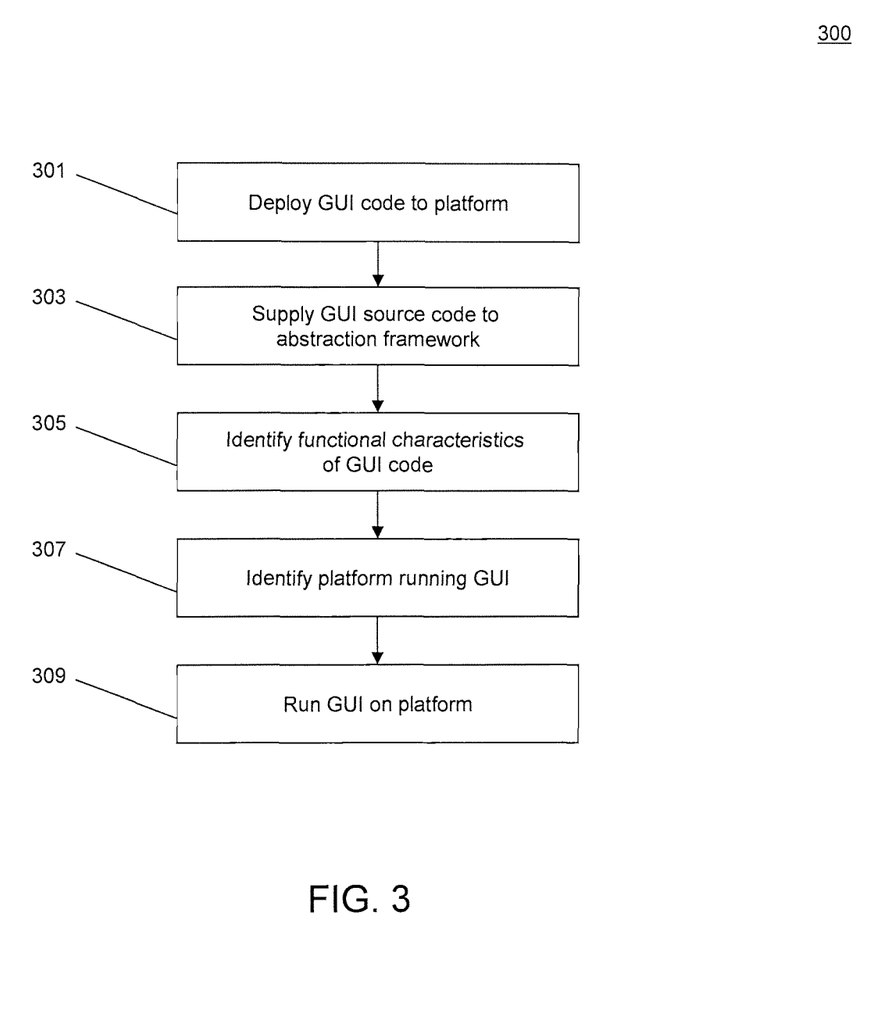
FIG. 3 illustrates an example of a process for deploying a GUI to one of a plurality of operating environments, according to an embodiment of the invention.

Once the abstraction framework is developed, it can be used to implement the multi-platform GUI in some or all of the various target platforms/operating environments. FIG. 3 illustrates a process 300, which is an example of a process by which the developed abstraction framework can be used to implement a multi-platform GUI on one or more of the plurality of target environments. Process 300 includes an operation 301 wherein the multi-platform GUI is deployed for use in an operating environment. The operating environment that the GUI is deployed to must be included in the target platforms identified/chosen during development of the abstraction framework (e.g., so that the abstraction framework knows how to translate between the GUI code and the operating environment/platform).

In an operation 303, the abstraction framework is supplied with source code for the GUI. In an operation 305, the abstraction framework examines and identifies the one or more functional characteristics of the GUI code. In an operation 307, the abstraction framework identifies what platform is attempting to run the GUI (or what platform the GUI is trying to run on). This may be accomplished by various methods such as, for example, detection of parameters to be passed to the target application, detection of registry settings of the target platform, recognition property files, recognition of "ini" files, or other methods. The GUI layer itself, however, is the same regardless of the operating environment/platform.

In an operation 309, the platform runs the GUI and the abstraction framework passes the appropriate commands to the platform according to the functional characteristics of the GUI and the operation of the underlying target software application. The abstraction framework is able to do this as long as the operating environment is one of those identified in the abstraction framework development process and the GUI source code is written in a language that the abstraction framework is designed to understand. Thus, the abstraction framework is able to provide a graphical user interface for the target software in multiple platforms even if the GUI was not written with any of the platforms in mind.

Figure 4:
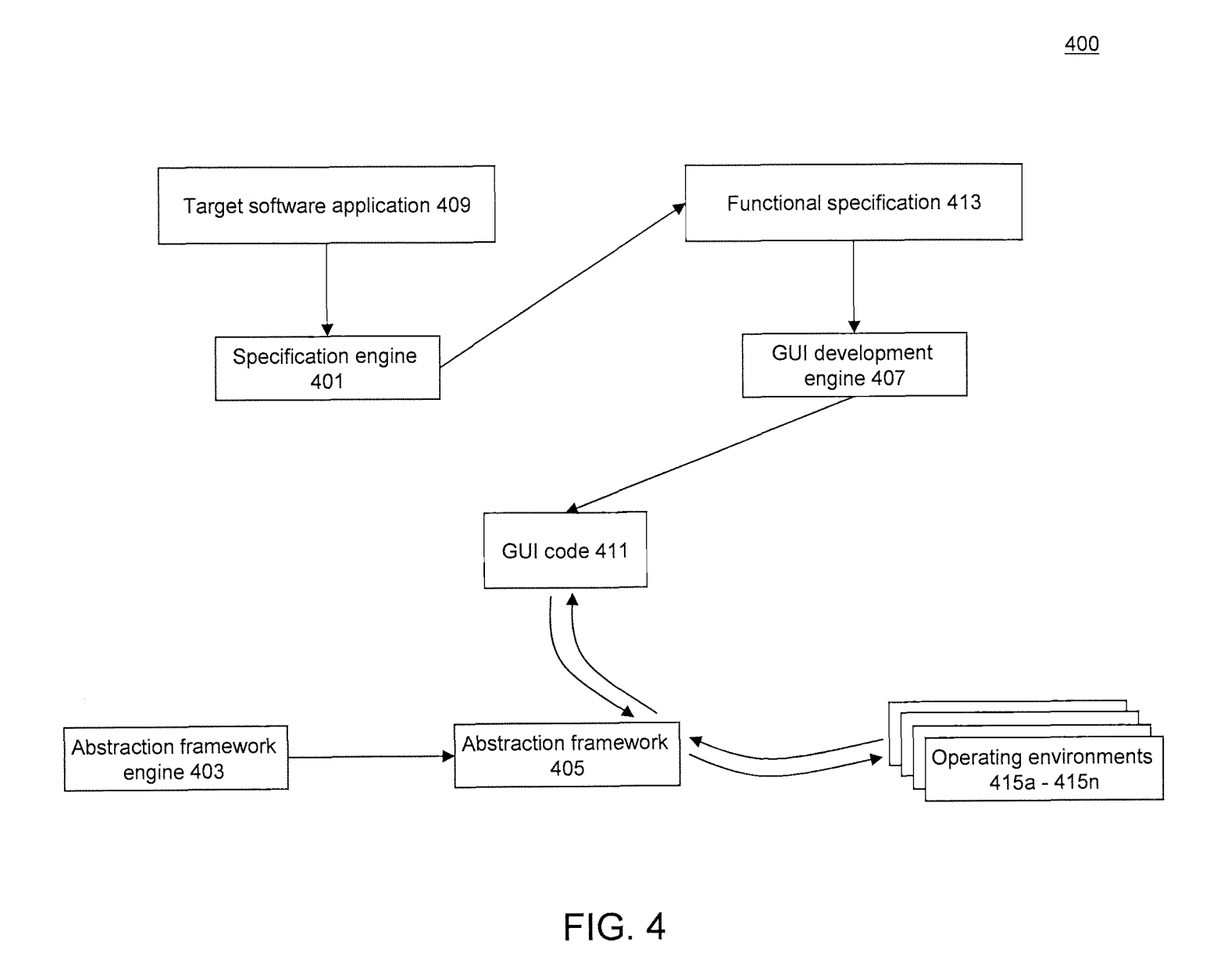
FIG. 4 illustrates a system for implementing a multi-platform GUI, according to an embodiment of the invention.

FIG. 4 illustrates a system 400 for developing and/or implementing a multi-platform GUI, according to some embodiments of the invention. System 400 may include a specification engine 401, an abstraction framework engine 403, an abstraction framework 405, a GUI development engine 407, and/or other elements.

In some embodiments, specification engine 401 may include one or more software modules, developers (e.g., people), and/or other elements that asses/identify the functional requirements of a target software application 409 for which a GUI 411 is to be developed. The specification engine may also produce a functional specification 413 for the GUI that is specific to target software application 409. In some embodiments, functional specification 413 may be represented as data stored in one or more formats (e.g., in a database or computer memory, an outline on a sheet of paper, in a computer readable format, or other format).

In some embodiments, abstraction framework engine 403 may include one or more software modules, developers, and/or other elements that produce a software piece (e.g., a module) that recognizes the functional characteristics of the source code of GUI 411 and translates those functional characteristics for a plurality of target platforms/operating environments (i.e., produces an abstraction framework 405). In some embodiments, abstraction framework engine 403 may write, assemble or otherwise develop one or more classes (e.g., Java classes) that comprise part or all of abstraction framework 405 and that are used to interface between GUI source code 411 and multiple target operating environments 415a-415n. As these one or more classes comprising abstraction framework 405 (or other software elements comprising abstraction framework 405) comprise source code, they can be created in many different ways such as, for example, written in Notepad or any number of Integrated Development Environments (IDEs) such as Microsoft's Visual Studio™ or Eclipse™. The one or more classes make up the abstraction framework that enables the GUI to operate on multiple operating environments. In some embodiments, the abstraction framework may include additional elements.

In some embodiments, development engine 407 may include one or more software modules, developers, and/or other elements that write, assemble, or otherwise produce source code for the multi-platform GUI 411. Multi-platform GUI source code 411 my be produced according to functional specification 413. Multi-platform GUI source code 411 relies upon abstraction framework 405 to provide functional interactivity with the operating environment on which GUI 411 is run. However, GUI 411 need not be modified to run on different operating environments 415, as abstraction framework 415 provides a ubiquitous interface with GUI 411 and handle any differential interaction with operating environment 415.

In some embodiments, system 400 for developing a multi-platform GUI for a software application may include one or more processors, memory devices, I/O devices, data storage devices, and/or other elements necessary to support, store, implement, or operate one or more of the specification engine, the abstraction framework engine, the abstraction framework, the development engine, GUI source code, or other elements of the system, in a computer-implemented environment.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A method of developing a graphical user interface for a target software application, the method comprising:
    developing source code for the graphical user interface, wherein the graphical user interface is independently operable on a plurality of operating environments including a thick-client operating environment and a thin-client operating environment; and
    developing an abstraction framework that mediates interaction between each of the plurality of operating environments and the source code for the graphical user interface by evaluating functions of the source code for the graphical user interface, identifying an operating environment from the plurality of operating environments which is attempting to interact with the graphical user interface or on which the graphical user interface is attempting to run, and providing an instruction necessary to perform the functions in each of the plurality of operating environments, wherein the abstraction framework identifies the operating environment which is attempting to interact with the graphical user interface and wherein said identifying the operating environment which is attempting to interact with the graphical user interface comprises one or more selected from: detection of parameters to be passed to the target software application, detection of registry settings of the operating environment, recognition of property files, or recognition of initialization files of the operating environment.

2. The method of claim 1, wherein the abstraction framework is written in java code, C++ code, or visual basic code.

3. The method of claim 1, wherein the abstraction framework is written in java code and wherein the abstraction framework comprises a java class.

4. The method of claim 1, wherein the source code for the graphical user interface comprises java code, C++ code, or visual basic code.

5. The method of claim 1, wherein said identifying the operating environment which is attempting to interact with the graphical user interface comprises the detection of parameters to be passed to the target software application or the recognition of property files.

6. A system for developing a graphical user interface for a target software application, the system comprising:
    a processor configured to receive instructions which, when executed, configure the system to implement:
    a graphical user interface development engine that produces source code for the graphical user interface, wherein the graphical user interface is independently operable on a plurality of operating environments including a thick-client operating environment and a thin-client operating environment; and
    an abstraction framework that mediates interaction between each of the operating environments and source code for the graphical user interface, wherein the abstraction framework evaluates functions of the source code for the graphical user interface, identifies an operating environment from the plurality of operating environments which is attempting to interact with the graphical user interface or on which the graphical user interface is attempting to run, and provides an instruction necessary to perform the functions in each of the plurality of operating environments, wherein the abstraction framework identifies the operating environment which is attempting to interact with the graphical user interface and wherein, to identify the operating environment which is attempting to interact with the graphical user interface, the abstraction framework performs one or more selected from: detection of parameters to be passed to the target software application, detection of registry settings of the operating environment, recognition of property files, or recognition of initialization files of the operating environment.

7. The system of claim 6, wherein the abstraction framework is written in java code, C++ code, or visual basic code.

8. The system of claim 6, wherein the abstraction framework is written in java code and wherein the abstraction framework comprises a java class.

9. The system of claim 6, wherein the source code for the graphical user interface comprises java code, C++ code, or visual basic code.

10. The system of claim 6, wherein the abstraction framework performs the detection of registry settings of the operating environment or the recognition of initialization files of the operating environment.

* * * * *